United States Patent
Fine et al.

(10) Patent No.: US 9,304,790 B2
(45) Date of Patent: Apr. 5, 2016

(54) MASKING POWER USAGE OF CO-PROCESSORS ON FIELD-PROGRAMMABLE GATE ARRAYS USING NEGATIVE FEEDBACK TO ADJUST A VOLTAGE VARIATION ON AN FPGA POWER DISTRIBUTION TRACE

(71) Applicant: Empire Technology Development LLC, Wilmington, DE (US)

(72) Inventors: Kevin Fine, Yverdon-les-Bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 7 days.

(21) Appl. No.: 13/978,877

(22) PCT Filed: Jan. 31, 2013

(86) PCT No.: PCT/US2013/024162
§ 371 (c)(1),
(2) Date: Apr. 10, 2014

(87) PCT Pub. No.: WO2014/120209
PCT Pub. Date: Aug. 7, 2014

(65) Prior Publication Data
US 2014/0237284 A1    Aug. 21, 2014

(51) Int. Cl.
G06F 1/00    (2006.01)
G06F 11/30   (2006.01)
G06F 9/455   (2006.01)
G06F 21/00   (2013.01)
G06F 21/55   (2013.01)

(52) U.S. Cl.
CPC .............. G06F 9/455 (2013.01); G06F 21/00 (2013.01); G06F 21/556 (2013.01)

(58) Field of Classification Search
CPC ............ G06F 11/30; G06F 9/455; G06F 9/38
USPC ................................................... 713/340, 300
See application file for complete search history.

(56) References Cited

U.S. PATENT DOCUMENTS

| | | | |
|---|---|---|---|
| 2003/0110200 A1* | 6/2003 | Kramskoy | 709/1 |
| 2006/0053323 A1 | 3/2006 | Kissell | |
| 2010/0208885 A1 | 8/2010 | Murphy | |
| 2010/0281450 A1 | 11/2010 | Kheterpal | |
| 2011/0013767 A1* | 1/2011 | Kim et al. | 380/28 |
| 2012/0311364 A1 | 12/2012 | Belt | |

(Continued)

OTHER PUBLICATIONS

Benini, et al., "A Novel Architecture for Power Maskable Arithmetic Units", GLSVLSI '03, Apr. 28-29, 2003, Washington DC, USA.*

(Continued)

*Primary Examiner* — Vincent Tran
*Assistant Examiner* — Robert Cassity
(74) *Attorney, Agent, or Firm* — Turk IP Law, LLC

(57) ABSTRACT

Technologies are generally described for masking power usage of co-processors on field-programmable gate arrays. In some examples, one or more moat brick circuits may be implemented around a co-processor loaded on a held-programmable gate array (FPGA). The moat brick circuits may be configured to use negative feedback and/or noise to mask the power usage variations of the co-processor from other co-processors on the FPGA.

21 Claims, 10 Drawing Sheets

(56) References Cited

U.S. PATENT DOCUMENTS

2013/0010957 A1    1/2013   Yu
2013/0019324 A1*   1/2013   Tehranipoor et al. ........... 726/34

OTHER PUBLICATIONS

"MIT Enterprise Forum Start-up Presentation: Nimbix," accessed at http://www.slideshare.net/mitdfw/mit-enterprise-forum-startup-presentation-nimbix, published on Mar. 12, 2012, pp. 5.
"Microsemi-SoC Products Group," accessed at https://web.archive.org/web/20130119065951/http://www.actel.com/products/solutions/security/analysis.aspx, Jan. 19, 2013, pp. 3.
International Search Report and Written Opinion for PCT/US13/24162, filed Jan. 31, 2013, mailed on Apr. 9, 2013.
Ors, et al. "Power-Analysis Attacks on an FPGA—First Experimental Results", Appeared in Cryptographic Hardware and Embedded Systems—CHES 2003, Lecture Notes in Computer Science 2779, C. K. Koc, C. Paar, and C. D. Walter (eds.), Springer-Verlag, pp. 35-50, Sep. 7-10, 2003.
"Protecting FPGAs from Power Analysis", Cryptography Research Whitepaper—version 1.0, Apr. 20, 2010.
Benini et al., "A Novel Architecture for Power Maskable Arithmetic Units", GLSVLSI'03, Apr. 28-29, 2003.
Regazzoni et al,, "FPGA Implementations of the AES Masked Against Power Analysis Attacks", Proceedings of COSADE 2011, pp. 56-66, Darmstadt, Germany, Feb. 2011.
Sims, "Carousel's Expert Walks Through Major Benefits of Virtualization", TMC Net, Jul. 6, 2010.
Delahunty, "The New urgency for Server Virtualization",InformationWeek, Aug. 15, 2011.
Maxfield, "New Xilinx Virtex-7 2000T FPGA provides equivalent of 20 milling ASIC gates", EE Times, Oct. 25, 2011.
Tromer et al., "Efficient cache attacks on AES, and countermeasures", International Association for Cryptologic Research, published Jul. 23, 2009.
Percival, "Cache Missing for Fun and Profit", Presented at BSDCan, May 2005.
Standaert et al., "Updates on the Security of FPGAs against Power Analysis Attacks", ARC 2006, vol. 3985, pp. 335-346, Mar. 2006.
Kocher et al., "Differential Power Analysis", in Advances in Cryptology, CRYPTO 99, 1999, pp. 789, Aug. 15-19, 1999.
Wollinger et al., "Cryptography on FPGAs: State of the Art Implementations and Attacks", ACM Special Issue Security and Embedded Systems, Mar. 2003.
Hotoleanu, "Implementation of a RTOS service for the management of the reconfiguration", version 1, Oct. 2011.
Valero et al., "3D FPGA Resource Management and Fragmentation Metric for Hardware Multitasking", Parallel and Distributed Processing, IPDPS, May 2009.
Masle et al., "Constant Power Reconfigurable Computing", International Conference on Field Programmable Technology, Dec. 2011.
Constan et al., "Security Challenges and Opportunities in Adaptive and Reconfigurable Hardware", IEEE International Symposium on Harware-Oriented Security and Trust (HOST), Jun. 2011.
Guneysu et al., "Generic Side-Channel Countermeasures for Reconfigurable Devices", presented at CHES, Nara, Japan, Sep. 2011.
Sunar et al., "A Provably Secure True Random Number Generator with Built-in Tolerance to Active Attacks". IEEE on Computers, pp. 109-119, Jan. 2007.

* cited by examiner

US 9,304,790 B2

MASKING POWER USAGE OF CO-PROCESSORS ON FIELD-PROGRAMMABLE GATE ARRAYS USING NEGATIVE FEEDBACK TO ADJUST A VOLTAGE VARIATION ON AN FPGA POWER DISTRIBUTION TRACE

CROSS-REFERENCE TO RELATED APPLICATION

This application is the U.S. National Stage filing under 35 U.S.C. §371 of PCT Application Ser. No. PCT/US2013/24162 filed on Jan. 31, 2013.

BACKGROUND

Unless otherwise indicated herein, the materials described in this section are not prior art to the claims in this application and are not admitted to be prior art by inclusion in this section.

Cloud computing allows for significant reduction in computing cost by leveraging economies of scale associated with, e.g., hardware. Cloud-based datacenters may use virtualization to serve large numbers of users. Individual users may be provided with an instance of a virtual machine (VM), and a single server at a datacenter may be able to simultaneously run multiple VMS from different users on its hardware.

Datacenters may also use hardware accelerators to increase efficiency and reduce costs. For example, field-programmable gate arrays (FPGAs) may be programmed with co-processors configured to increase computing efficiency and lower operating costs for parallelizable processes. Some FPGAs may be capable of allowing multiple co-processors to run at the same time, increasing computing power for many users at once.

SUMMARY

The present disclosure generally describes techniques for masking power usage of co-processors on field-programmable gate arrays.

According to some examples, a method is provided for masking power usage of co-processors on field-programmable gate arrays The method may include determining a power usage of a co-processor to be loaded on the FPGA, generating at least one moat brick circuit based on the determined power usage, loading the co-processor on the FPGA, and loading the at least one moat brick circuit on the FPGA such that the at least one moat brick circuit is physically adjacent to the co-processor and at least partially masks the power usage of the co-processor.

According to other examples, a configuration controller is provided for masking power usage of co-processors on fie le gate arrays. The controller may include a moat builder module and a processing module. The moat builder module may be configured to determine a power usage of a co-processor to be loaded on the FPGA and generate at least one moat brick circuit based on the determined power usage. The processing module may be configured to load the co-processor and the at least one moat brick circuit on the FPGA such that the at least one moat brick circuit is physically adjacent to the co-processor and at least partially masks the power usage of the co-processor.

According to further examples, a cloud-based datacenter is provided that masks co-processor power usage. The datacenter may include a field-programmable gate array (FPGA) and a configuration controller. The configuration controller may be configured to determine a power usage of a co-processor to be loaded on the FPGA, generate at least one moat brick circuit based on the determined power usage, and load the co-processor and the at least one moat brick circuit on the FPGA such that the at least one moat brick circuit is physically adjacent to the co-processor and at least partially masks the power usage of the co-processor.

According to some examples, a computer readable medium may store instructions for masking power usage of co-processors on field-programmable gate arrays. The instructions may include determining a power usage of a co-processor to be loaded on the FPGA, generating at least one moat brick circuit based on the determined power usage, loading the co-processor on the FPGA, and loading the at least one moat brick circuit on the FPGA such that the at least one moat brick circuit is physically adjacent to the co-processor and at least partially masks the power. usage of the co-processor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
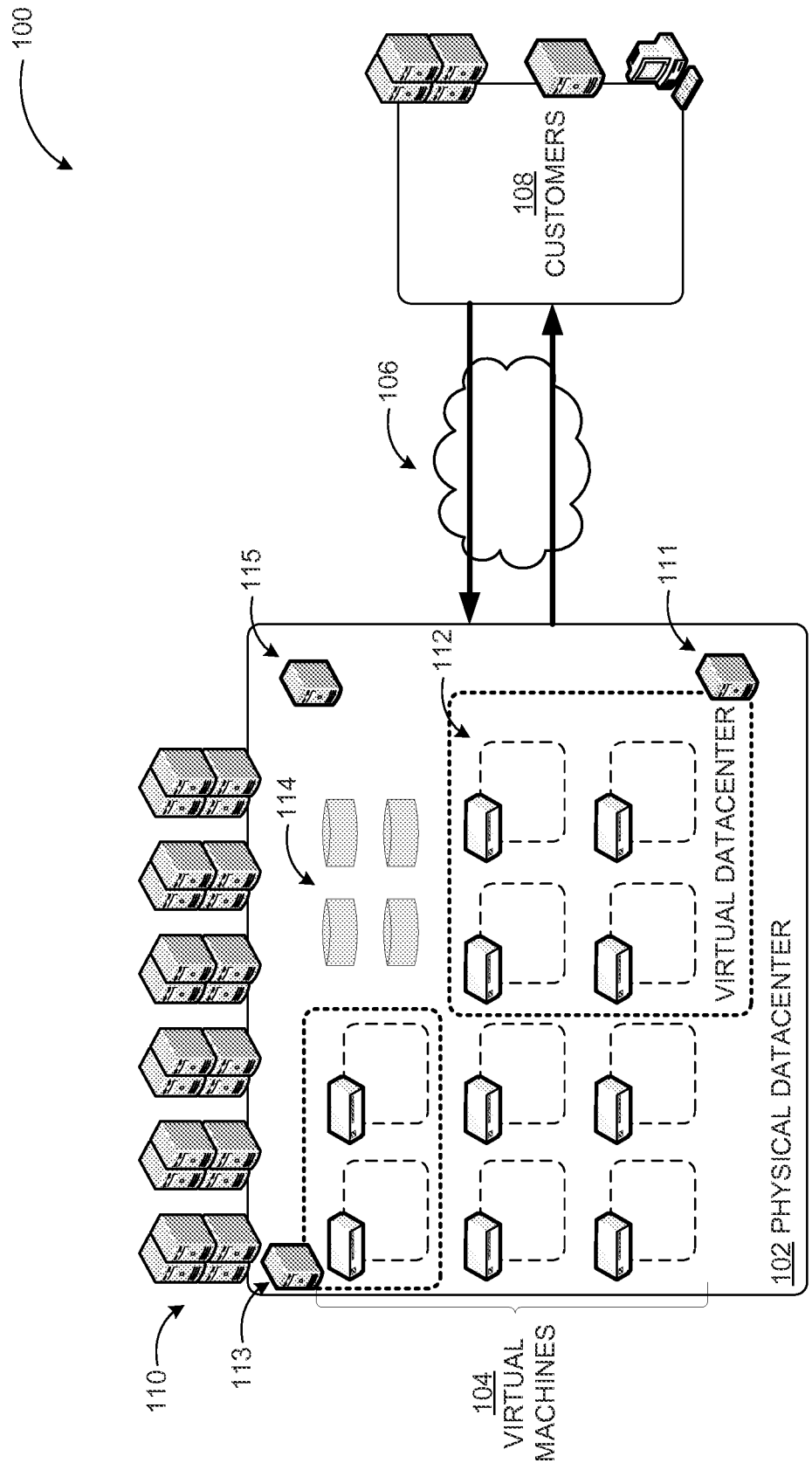
FIG. 1 illustrates an example datacenter-based system where masking power usage of co-processors on field-programmable gate arrays may be implemented.

In the following detailed description, reference is made to the accompanying drawings, which form apart hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to masking power usage of co-processors on field-programmable gate arrays.

Briefly stated, technologies are generally described for masking power usage of co-processors on field-programmable gate arrays. In some examples, one or more moat brick circuits may be implemented around a co-processor loaded on a field-programmable gate array (FPGA). The moat brick circuits may be configured to use negative feedback and/or noise to mask the power usage variations of the co-processor from other co-processors on the FPGA.

FIG. 1 illustrates an example datacenter-based system where masking power usage of co-processors on field-programmable gate arrays may be implemented, arranged in accordance with at least some embodiments described herein.

As shown in a diagram 100, a physical datacenter 102 may include one or more physical servers 110, 111, 113, and 115, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services 114 such as various applications, data storage, data processing, or comparable ones to a group of customers 108, such as individual users or enterprise customers, via a cloud 106.

Figure 2:
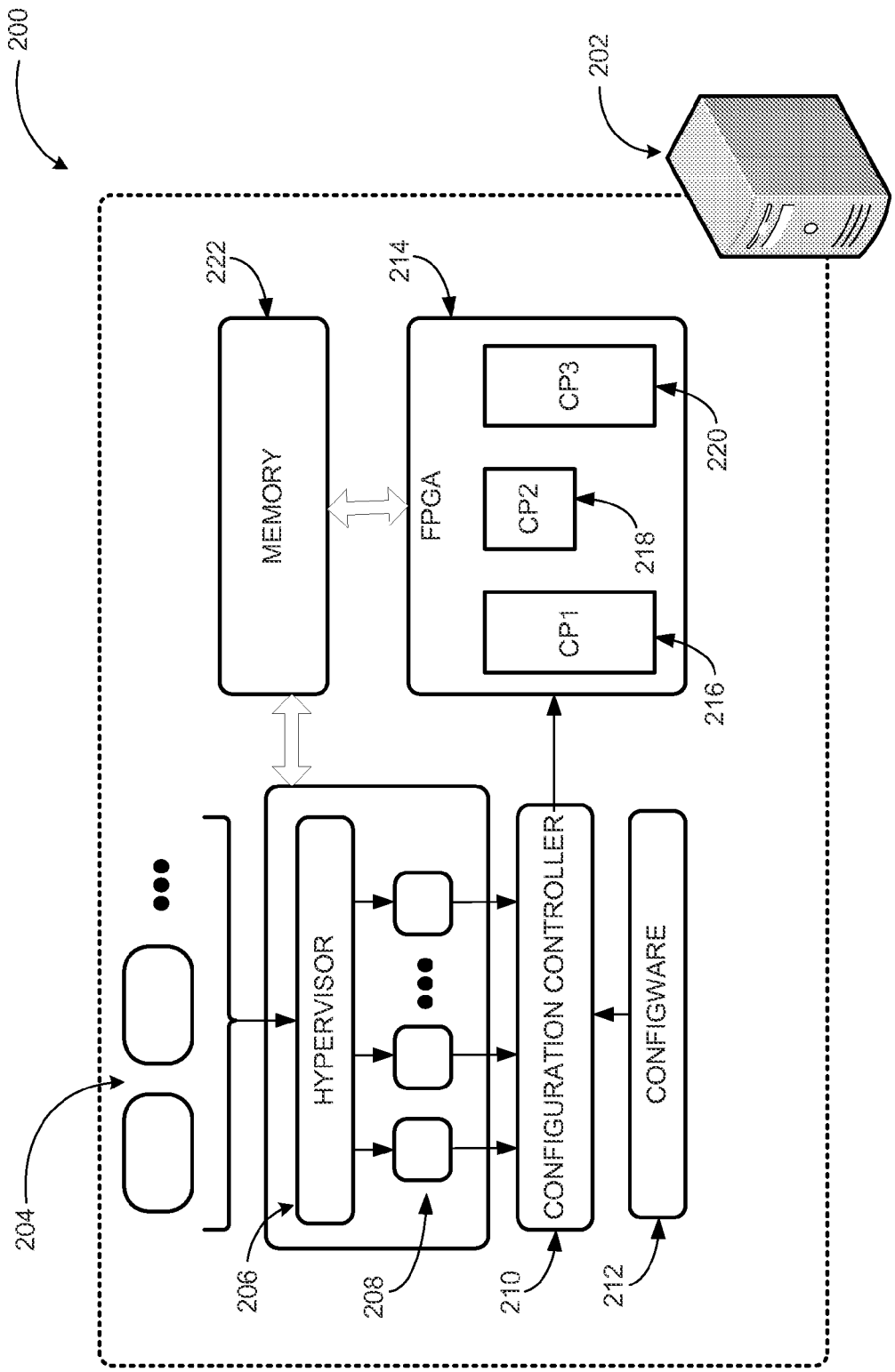
FIG. 2 illustrates an example datacenter-based system where co-processors may be implemented on a field-programmable gate array.

FIG. 2 illustrates an example datacenter-based system where co-processors may be implemented on a field-programmable gate array, arranged in accordance with at least some embodiments described herein.

As shown in a diagram 200, a physical server 202 (e.g., the physical servers 110, 111, or 113 in FIG. 1) may execute a number of virtual machines 204, each of which may be associated with a user. A hypervisor module 206 may manage the loading of the virtual machines 204 onto a number of processor cores 208, and may coordinate the sharing of the processor cores 208 between the virtual machines 204. The physical server 202 may also include a field-programmable gate array (FPGA) 214. The FPGA 214 may include multiple logic cells or digital units, which may be combined to form circuits and/or processors with various functionalities. To increase the computing efficiency and speed of the virtual machines 204, a configuration controller 210 may be configured to load co-processors 216, 218, and 220 onto the FPGA 214. The co-processors 216, 218, and 220 may function or serve as hardware accelerators for one or more of the virtual machines 204, which may transfer part of their computing loads to the co-processors 216, 218, and/or 220 by, for example, communicating data via a system memory 222.

In some embodiments, the configuration controller 210 may load the co-processors 216, 218, and/or 220 onto the FPGA 214 based on a configware 212 or multiple configwares, which may be stored in memory. The configware 212 may include descriptor files for co-processors to be loaded onto the FPGA 214. For example, the descriptor files in the configware 212 may list the various digital elements and inputs/outputs to be connected on the FPGA 214 in order to load a particular co-processor on the FPGA 214. In some embodiments, the descriptor files may take the form of hardware descriptor language (HDL) files, which may be compiled to provide netlist files, which in turn may include detailed lists of connections and elements of the co-processor circuit.

Figure 3A:
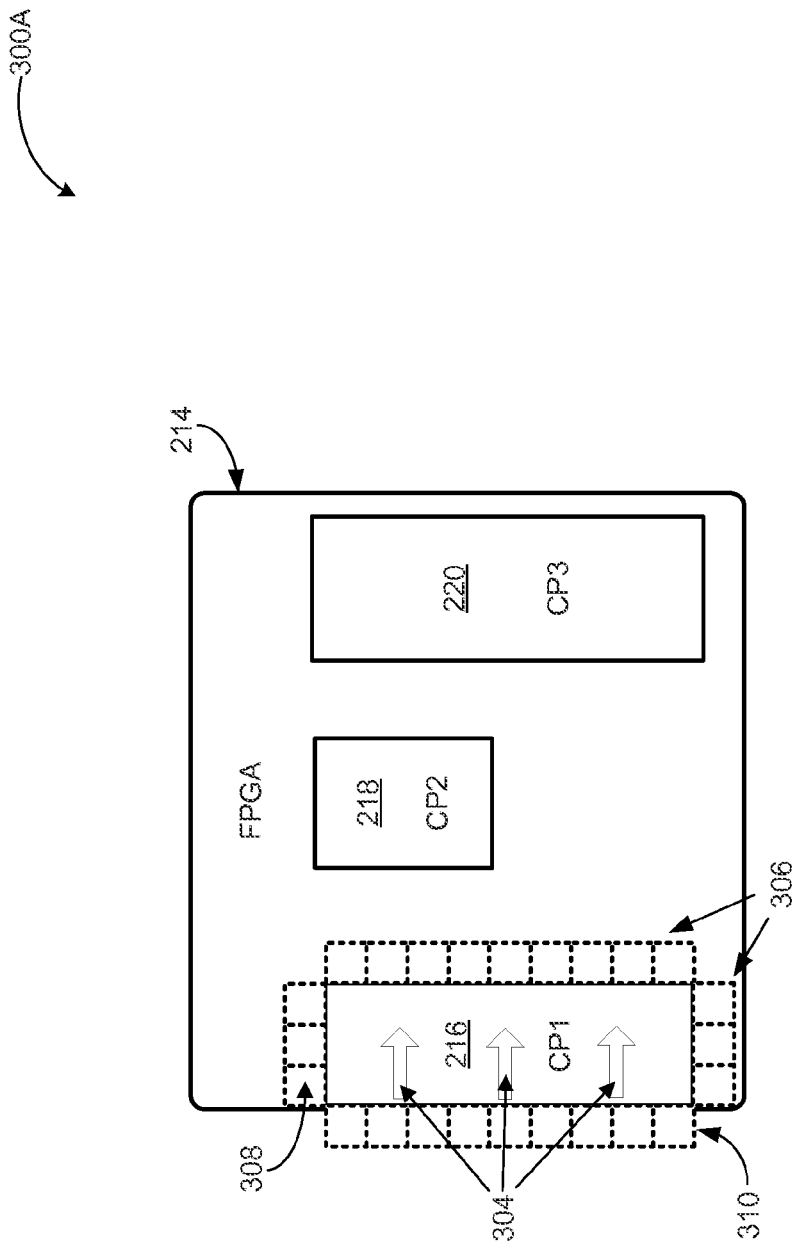
FIG. 3A illustrates an example field-programmable gate array where the power usage of implemented co-processors may be masked.

FIG. 3A illustrates an example field-programmable gate array where the power usage of implemented co-processors may be masked, arranged in accordance with at least some embodiments described herein.

As shown in a diagram 300A, the co-processors 216, 218, and 220 may be loaded on the FPGA 214 as described in FIG. 2. In some circumstances, an attacker may be able to perform a side channel power attack against a co-processor loaded on the FPGA 214. Power attacks use the fact that the energy consumed by a hardware module depends on the switching activity of its transistors. One source of dynamic power consumption in an FPGA may be due to the charging of capacitance. In some embodiments, the average power consumed W may be given as:

$$W = C_L V_{DD}^2 P_{0\rightarrow 1} f \quad (1)$$

where $C_L$ is the gate load capacitance, $V_{DD}$ is the supply voltage, f is the clock frequency, and $P_{0\rightarrow 1}$ is the probability of a 0 to 1 output transition. As a result, the power consumed by an individual FPGA gate may depend on the data that it is processing.

In practical applications, these power variations may be masked by noise and by multiple gates operating at the same time. However, an attacker may still be able to extract information by using differential power analysis (DPA). DPA involves using statistical techniques tailored to the algorithm being attacked. An attacker may use DPA to make multiple observations of the power dissipation of a target device during operation, thereby extracting all or part of the data being processed, For example, if the target algorithm is a cryptographic algorithm using a secret key, an attacker may be able to use DPA to extract part of or the entire secret key.

in a datacenter environment where FPGAs are used to load multiple co-processors to increase computing efficiency, a malicious co-processor may be configured to measure the power usage of the FPGA (or portions of the FPGA) and transmit the power usage data back to an attacker for a DPA attack. Referring to FIG. 3, suppose that the co-processor 218 is such a malicious co-processor. The co-processor 218 may be configured to measure power usage by monitoring the voltages and currents of power distribution traces that run through the co-processor 218. At least one power distribution trace runs through both the malicious co-processor 218 and, for example, the co-processor 216 (the top power distribution trace of the power distribution traces 304). The power usage (and data processing) of the co-processor 216 may be reflected in voltage and current variations in the power distribution traces 304. As a result, by monitoring one of the power distribution traces 304, the malicious co-processor 218 may be able to at least partially measure the power usage and therefore the data processing of the co-processor 216.

To address this issue, one or more co-processor moats 306 for masking co-processor power usage may be provided. The co-processor moats 306 may be loaded onto the FPGA 214 so as to surround a co-processor to be protected (e.g., the co-processor 216). The loaded co-processor moats 306 may be placed or positioned physically adjacent to the co-processor or spaced some distance away. During operation of the co-processor 216, the co-processor moats 306 may adjust the voltage and/or current on the power distribution traces 304. As a result, the voltage and/or current variations on the power distribution traces 304 due to co-processor processing may be masked from observers (e.g., the co-processor 218).

The co-processor moats 306 may be formed from one or more moat circuit bricks 308. The moat circuit brick 308 may be an individual co-processor circuit configured to mask the power usage variations of a neighboring co-processor from another co-processor. For example, as described below in FIG. 5, a moat brick circuit may include circuitry for using negative feedback to even out the observable power usage variations of the neighboring co-processor. Similarly, a moat brick circuit may also or instead) include circuitry to provide power usage noise to render the observable power usage variations of the neighboring co-processor unreliable as an indicator of the actual performance of the co-processor. A moat circuit brick, although functional, may be combined (hence the name "brick") to form larger power usage-masking moats (e.g., the co-processor moats 306). Using the moat circuit bricks 308 may simplify moat construction by allowing moats to be easily scaled for different co-processors and power usages. In some embodiments, a library of pre-defined moat circuit brick primitives may be used to construct individual moat circuit bricks that may then be assembled into co-processor moats.

In some embodiments, while the co-processor moats 306 may initially be arranged to surround a co-processor to be protected, co-processor moats 310 that would outside a boundary (e.g., the edge of the FPGA 214) if loaded may not actually be loaded. For example, the co-processor moat 310 positioned to the left of the co-processor 216 may not be needed because the co-processor 216 is at the edge of the FPGA 214 and no co-processors malicious or otherwise) can reside outside the FPGA 214. As a result, the co-processor moat 310 may not be loaded when the co-processor and other moats are loaded onto the FPGA.

While the co-processors 216, 218, and 220 are depicted as rectangular regions of gates and memory units, in some embodiments co-processors loaded onto an FPGA may have different shapes, or even be spread across different chips or FPGAs. Regardless of the actual shape of a loaded co-processor, co-processor moats may still be implemented as described herein. Moreover, moat bricks according to embodiments may be positioned inside or outside the FPGA.

Figure 3B:
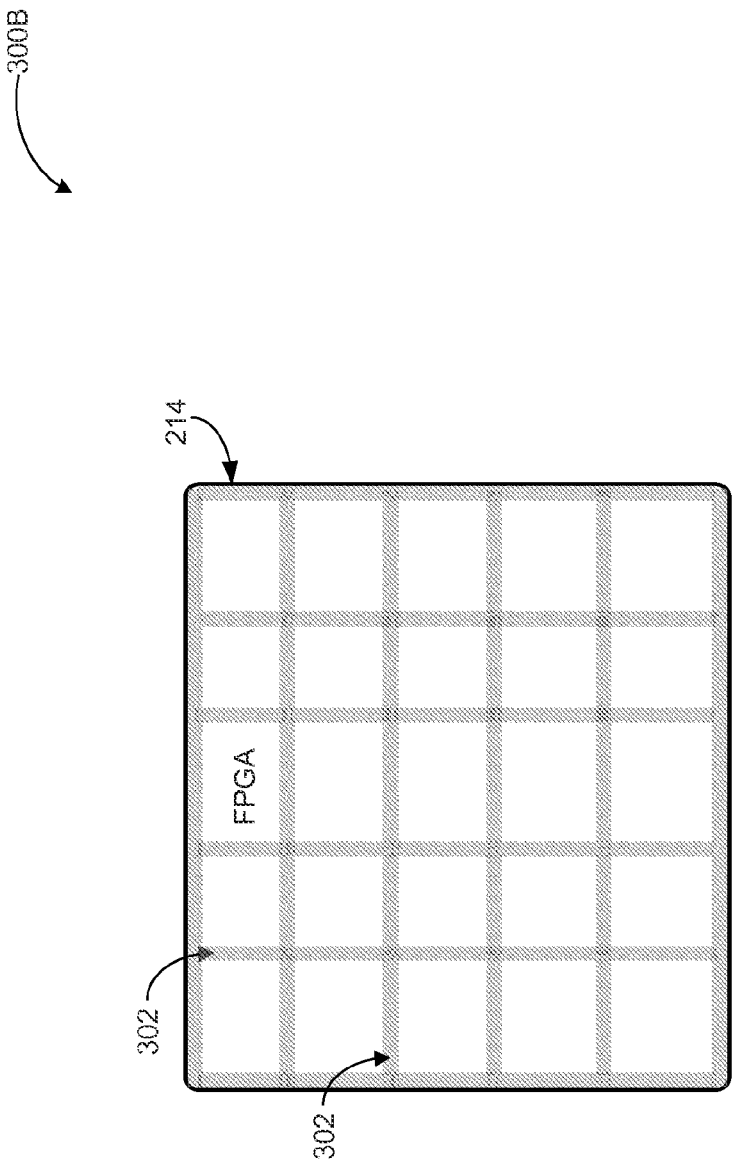
FIG. 3B illustrates an example field-programmable gate array with its power distribution network.

FIG. 3B illustrates an example field-programmable gate array with its power distribution network, arranged in accordance with at least some embodiments described herein.

As shown in a diagram 300B, the FPGA 214 further includes a power distribution network 302 formed of multiple power distribution traces, depicted as gray lines. The power distribution network 302 may provide power in the form of current and voltage to the various digital elements in the FPGA. Each co-processor loaded on the FPGA 214 may receive power for its constituent digital elements from one or more of the power distribution traces in the power distribution network 302. For example, power distribution traces may supply power (in the form of current) to co-processors.

Figure 4:
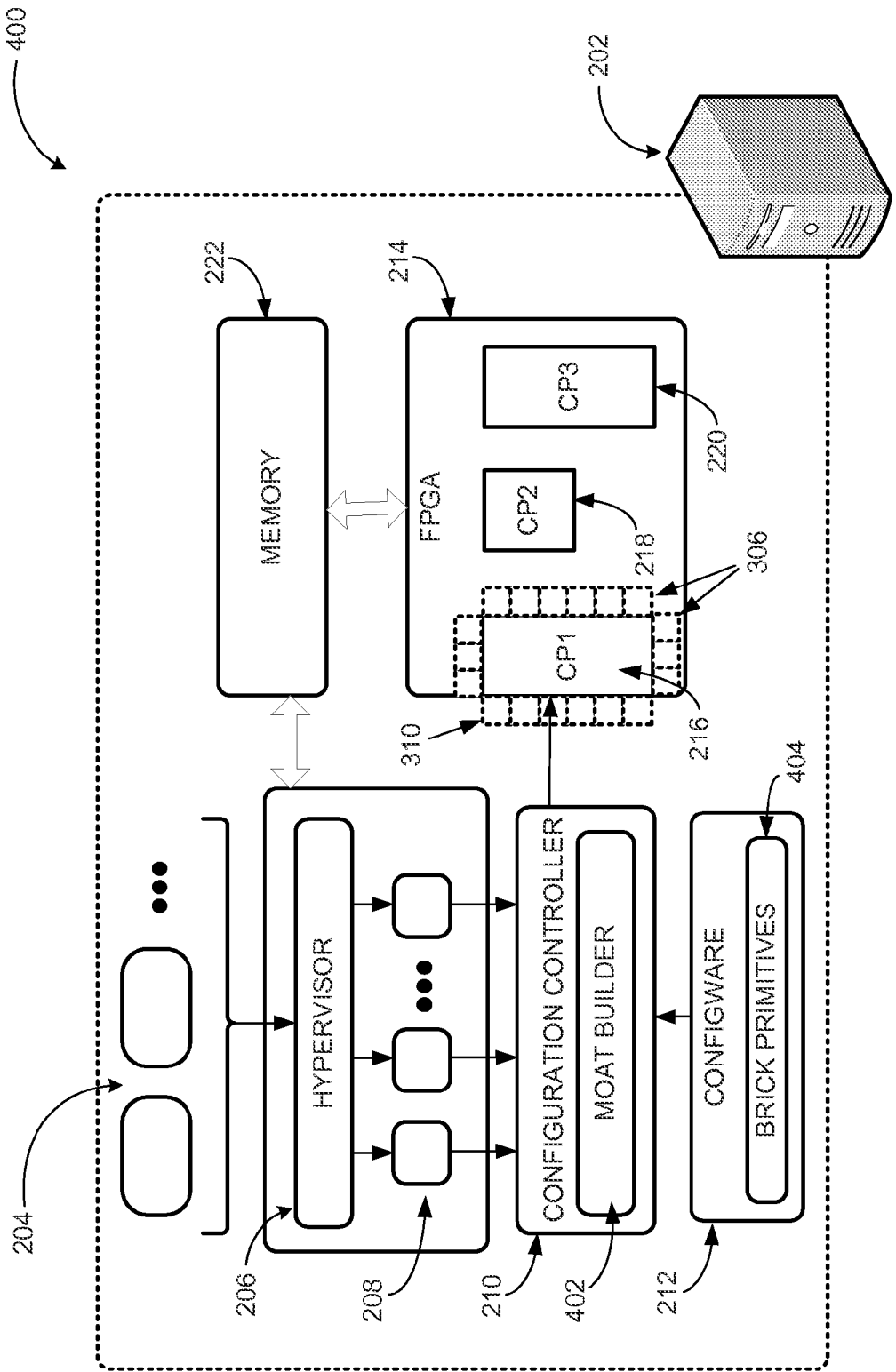
FIG. 4 illustrates an example datacenter-based system where the power usage of co-processors implemented on a field-programmable gate array may be masked.

FIG. 4 illustrates an example datacenter-based system where the power usage of co-processors implemented on a field-programmable gate array may be masked, arranged in accordance with at least some embodiments described herein.

FIG. 4 is similar to FIGS. 2 and 3, with similarly-numbered elements behaving similarly. According to a diagram 400, the co-processor moats 306 may be implemented to mask the power usage of the co-processor 216, similar to FIG. 3. The configuration controller 210 may include a moat builder module 402 for building the co-processor moats 306 from one or more moat circuit bricks (e.g., the moat circuit bricks 308 in FIG. 3). In some embodiments, the moat builder module 402 may be configured to use circuit brick primitives 404 stored in the configware 212 to construct the moat circuit bricks that go into the co-processor moats 306. For example, the configware 212 may store the brick primitives 404 as a library, and the moat builder module 402 may select one or more of the brick primitives 404 from the library for building moat circuit bricks.

Subsequently, the configuration controller 210 may load the co-processor moats 306 and the co-processor 216 onto the FPGA 214. For example, the configuration controller 210 may assemble the co-processor 216 and the co-processor moats 306 into a composite co-processor. The configuration controller 210 may then load the composite co-processor onto the FPGA 214 according to, for example, a placer algorithm that may determine a suitable location for the composite co-processor on the FPGA 214. As described above, in some embodiments co-processor moats that fall outside an FPGA boundary may not actually be loaded. For example, if the co-processor 216 is to be loaded near the edge of the FPGA 214, as depicted in FIG. 4, the co-processor moat 310 may not actually be loaded, because it may not be needed to mask the power usage of the co-processor 216.

Figure 5:
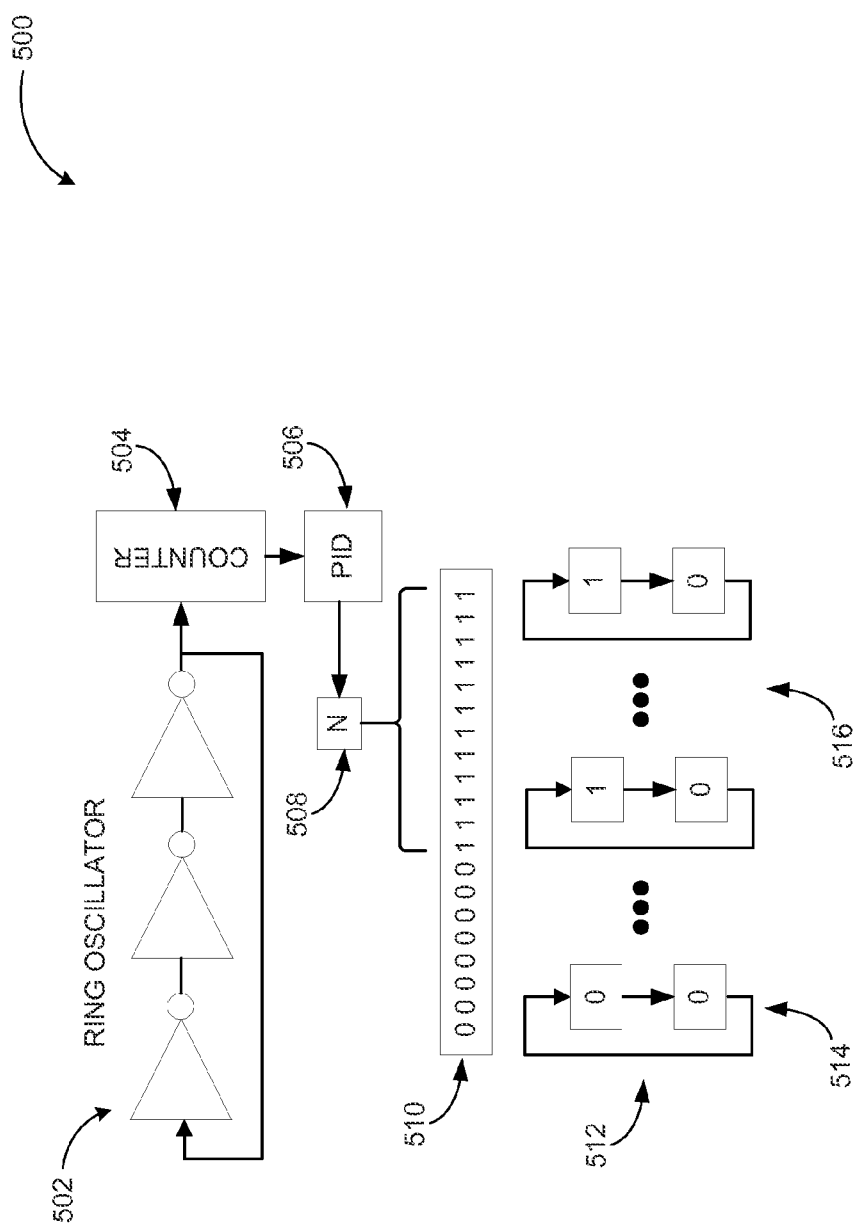
FIG. 5 illustrates an example component for masking the power usage of co-processors implemented on a field-programmable gate array.

FIG. 5 illustrates an example component for masking the power usage of co-processors implemented on a field-programmable gate array, arranged in accordance with at least some embodiments described herein.

According to a diagram 500, a component for masking co-processor power usage may include a ring oscillator 502. The ring oscillator 502 may be configured to oscillate at a frequency proportional to a supplied power, which may then be converted into a counter value by a counter 504. The counter value may then be provided to a digital proportional-integral-derivative (PID) controller 506. The PID controller 506 may then produce a value N (508) which may be proportional to the extra power needed to keep total power consumption constant. The value N 508 may then be used to generate a bit sequence 510, which in turn may be used to drive a bank of shift registers 512, each of which may be cycling through values driven by a fast clock. Some of the shift registers in the bank 512, such as a shift register 514, may cycle between two identical values (e.g., 1 and 1 or 0 and 0). These shift registers may consume very little power. Other shift registers in the bank 512, such as the shift registers 516, may cycle between 0 and 1, consuming power during the 0 to 1 transition (see equation 1, above). Therefore, the amount of power consumed by the component may be controlled by adjusting the number of shift registers that are cycling between 0 and 1. As a result, the component depicted in the diagram 500 consumes more power if a co-processor to be protected uses less power, and vice-versa. This negative feedback behavior may be used to mask co-processor power usage by reducing the total amount of observable power usage variation.

In some embodiments, a moat circuit brick (e.g., the moat circuit brick 308 in FIG. 3) may include a compact copy of the component depicted in the diagram 500, with a co-processor moat (e.g., the co-processor moat 306 in FIGS. 3 and 4) including multiple copies of the component. In other embodiments, one moat circuit brick may include the ring oscillator 502, the counter 504, and the PID controller 506, and other moat circuit bricks may only include different banks of shift registers similar to the bank 512.

The component depicted in the diagram 500 may mask co-processor power usage by using negative feedback to reduce variations in power. In some embodiments, a moat circuit block may also (or instead) provide noise to mask variations in power. In these embodiments, a moat circuit brick may include a random number generator. The random number generator may add random noise in the form of randomly varying power consumption. This randomly varying power consumption, when added to the actual co-processor power consumption, may serve to hide the actual co-processor power usage variations. In some embodiments, the random number generator may be sensitive to power usage level such that random power consumption is higher during periods of low co-processor power usage, and vice-versa.

Figure 6:
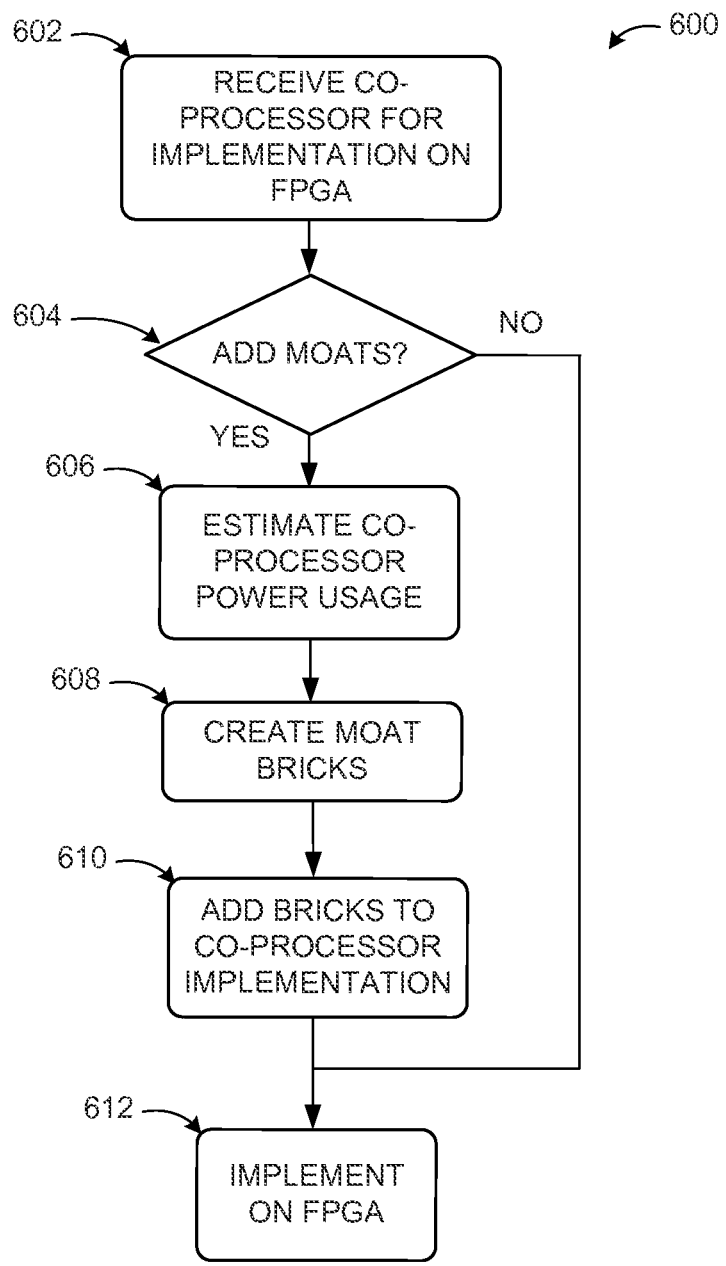
FIG. 6 illustrates an example process for masking power usage of co-processors implemented on field-programmable gate arrays.

FIG. 6 illustrates an example process for masking power usage of co-processors implemented on field-programmable gate arrays, arranged in accordance with at least some embodiments described herein.

As depicted in a diagram 600, a process for masking power usage of co-processors implemented on field-programmable gate arrays (FPGAs) may begin with an operation 602, where a co-processor to be implemented on an FPGA may be received. In some embodiments, a datacenter client or customer may provide the co-processor, and a configuration controller (e.g., the configuration controller 210 in FIG. 4) may receive the co-processor. The co-processor may be received in the form of one or more descriptor tiles, such as a hardware descriptor language (HDL) file or a netlist file.

At a next operation 604, the configuration controller 210 may determine if moats should be added to the received co-processor to provide power usage masking. In some embodiments, moats for a co-processor may be provided if the datacenter client/customer requests the service and/or pays a fee for the service.

If in operation 604 it is determined that moats should not be added, then at an operation 612 the received co-processor may be implemented or loaded onto the FPGA by the configuration controller 210. On the other hand, if in operation 604 it is determined that moats should be added, in a next operation 606 the power usage of the received co-processor may be estimated by the configuration controller 210. Co-processor power consumption may be estimated based on the number of gates and/or logic units in the co-processor. Co-processor power consumption may also (or instead) be determined based on a power measured during a previous deployment of the co-processor. In some embodiments, variations in power usage may also be estimated, for example as a percentage of total co-processor power or statistically based on combining known variations of each logic unit.

Subsequently, in an operation 608, one or more moat bricks may be created by the moat builder 402. The power usage estimated in the operation 606 may be used to estimate the amount of power usage masking needed for each moat brick. The moat bricks may then be created based on one or more brick primitives (e.g., the brick primitives 404 in FIG. 4) and then assembled into the final moat. In some embodiments, the size of each moat brick and/or the number of moat brick layers in the final moat may be adjusted based on the amount of power usage masking estimated above.

In a next operation 610, the moat bricks may be added to the co-processor implementation by the moat builder 402. For example, the moat bricks may be tiled around the co-processor to form moats that completely surround the co-processor. In some embodiments, as described above, the moat bricks may be added to the co-processor to form a composite co-processor.

Finally, in an operation 612, the moat bricks and the co-processor may be implemented on the FPGA. In some embodiments, hardware description language (HDL) files or netlist files may be used to load the moat bricks and the co-processor onto the FPGA.

Figure 7:
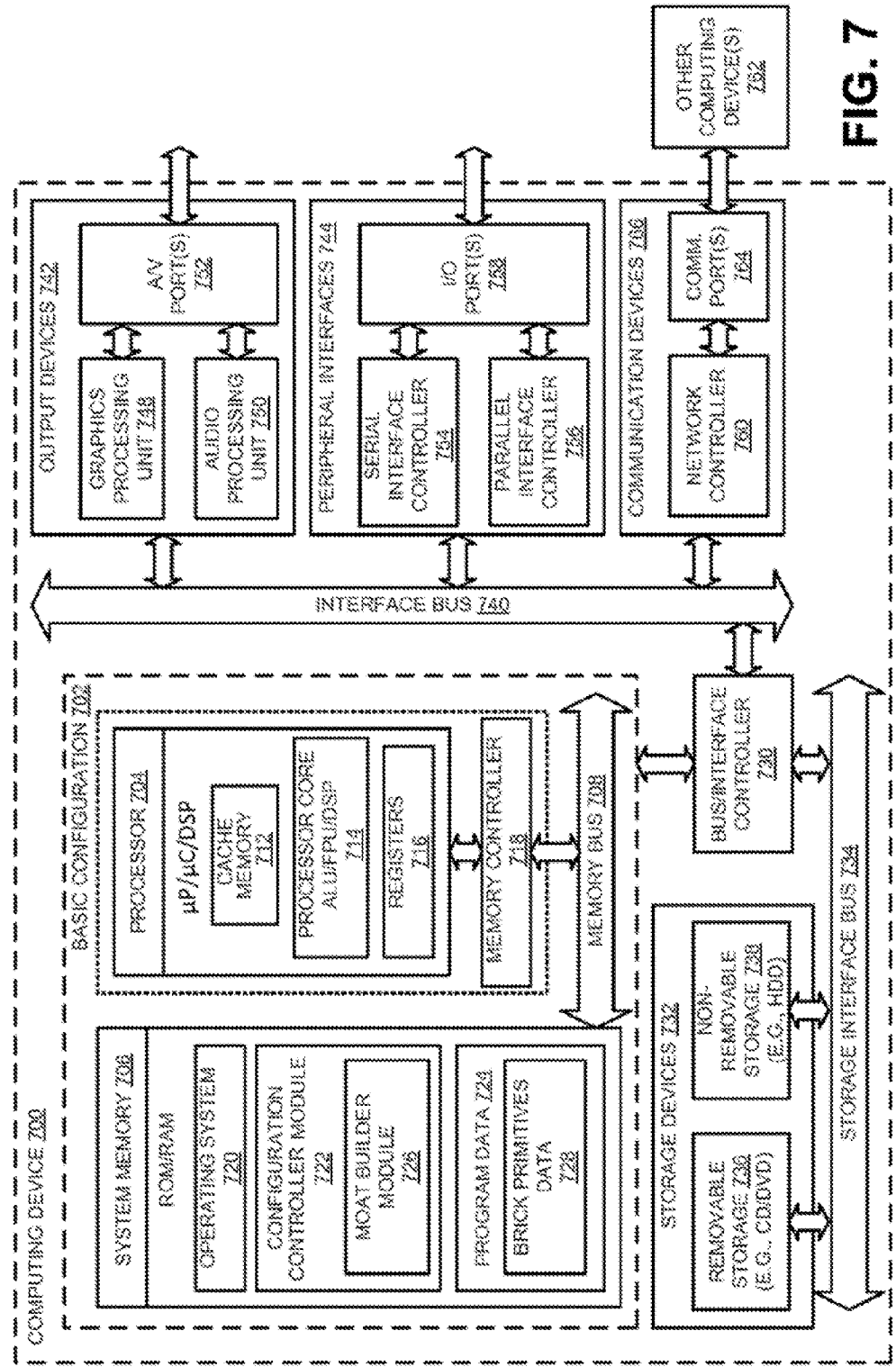
FIG. 7 illustrates a general purpose computing device, which may be used to mask power usage of co-processors on field-programmable gate arrays.

FIG. 7 illustrates a general purpose computing device, which may be used to mask power usage of co-processors on field-programmable gate arrays, arranged in accordance with at least some embodiments described herein.

For example, the computing device 700 may be used to mask power usage of co-processors on field-programmable gate arrays as described herein. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor ($\mu P$), a microcontroller ($\mu C$), a digital signal processor (DSP), or any combination thereof. The processor 704 may include one more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a configuration controller module 722, and program data 724. The configuration controller module 722 may include a moat builder module 726 for masking power usage of co-processors on field-programmable gate arrays as described herein. The program data 724 may include, among other data, brick primitives data 728 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods for masking power usage of co-processors on field-programmable gate arrays. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 8:
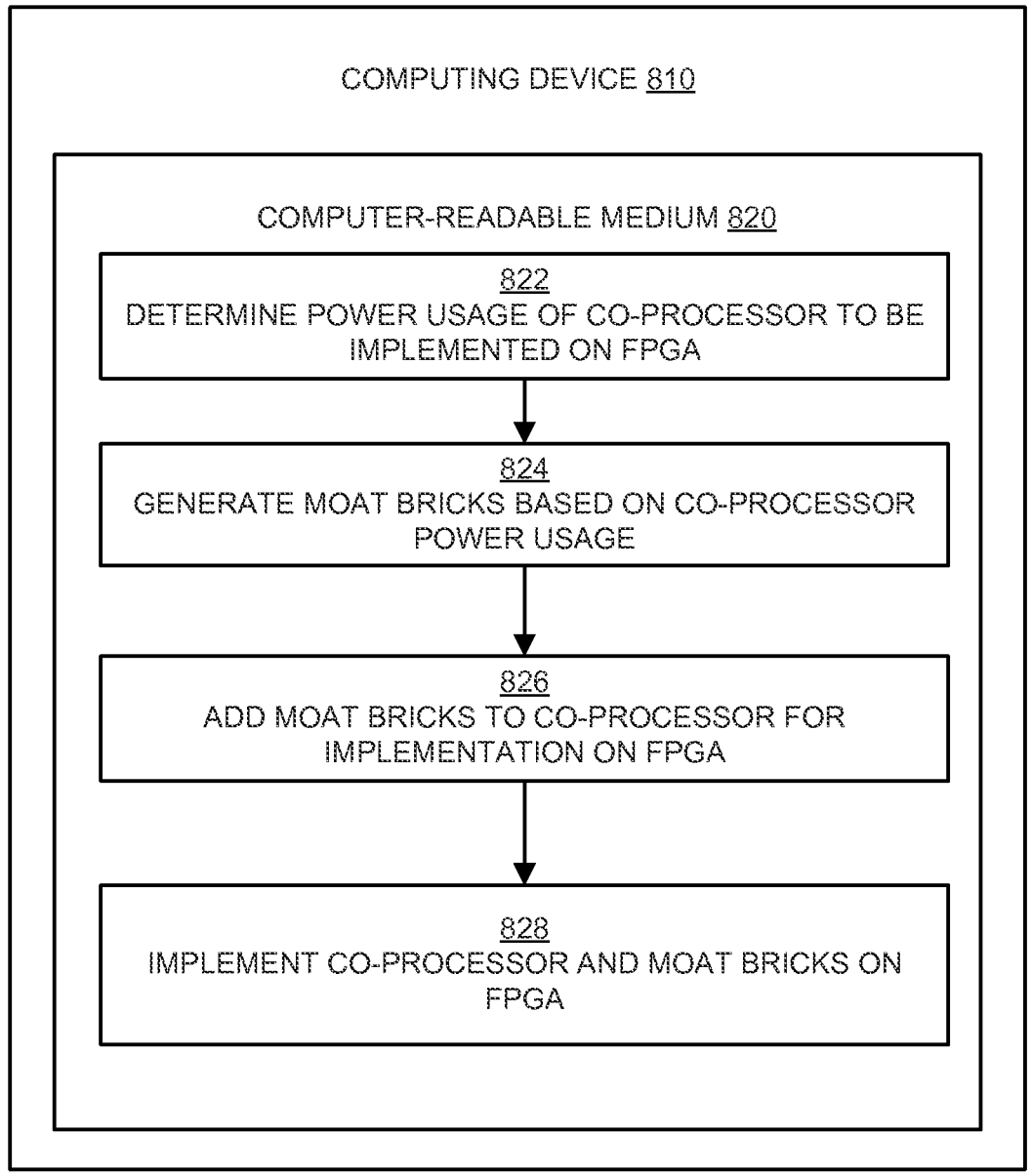
FIG. 8 is a flow diagram illustrating an example method for masking power usage of co-processors on field-programmable gate arrays that may be performed by a computing device such as the computing device in FIG. 7.

FIG. 8 is a flow diagram illustrating an example method for masking power usage of co-processors on field-programmable gate arrays that may be performed by a computing device such as the computing device in FIG. 7, arranged in accordance with at least some embodiments described herein.

Example methods may include one or more operations, functions or actions as illustrated by one or more of blocks 822, 824, 826, and/or 828, and may in some embodiments be performed by a computing device such as the computing device 700 in FIG. 7. The operations described in the blocks 822-828 may also be stored as computer-executable instructions in a computer-readable medium such as a computer-readable medium 820 of a computing device 810.

An example process for masking power usage of co-processors on field-programmable gate arrays may begin with block 822, "DETERMINE POWER USAGE OF CO-PROCESSOR TO BE IMPLEMENTED ON FPGA", where the power usage of a co-processor to be implemented on a field-programmable gate array (e.g., the co-processor 216 in FIG. 4) may be determined or estimated. In some embodiments, a configuration controller (e.g., the configuration controller 210 in FIG. 4) may determine the power usage, as described above in relation to the operation 606 in FIG. 6.

Block 822 may be followed by block 824, "GENERATE MOAT BRICKS BASED ON CO-PROCESSOR POWER USAGE", where one or more moat bricks may be generated based on the determined co-processor power usage. For example, the configuration controller 210 and/or the moat builder module 402 in FIG. 4 may generate the moat bricks as described above in relation to the operation 608 in FIG. 6.

Block 824 may be followed by block 826, "ADD MOAT BRICKS TO CO-PROCESSOR for IMPLEMENTATION ON FPGA", where the generated moat bricks may be added to the co-processor for implementation on the FPGA. For example, the configuration controller 210 in FIG. 4 may add the moat bricks to the co-processor as described above in relation to the operation 610 in FIG. 6

Finally, block 826 may be followed by block 828, "IMPLEMENT CO-PROCESSOR AND MOAT BRICKS ON FPGA", where the co-processor and moat bricks may be loaded onto the FPGA. For example, the configuration controller 210 in FIG. 4 may load the co-processor and moat bricks onto the FPGA as described above in relation to the operation 612 in FIG. 6.

Figure 9:
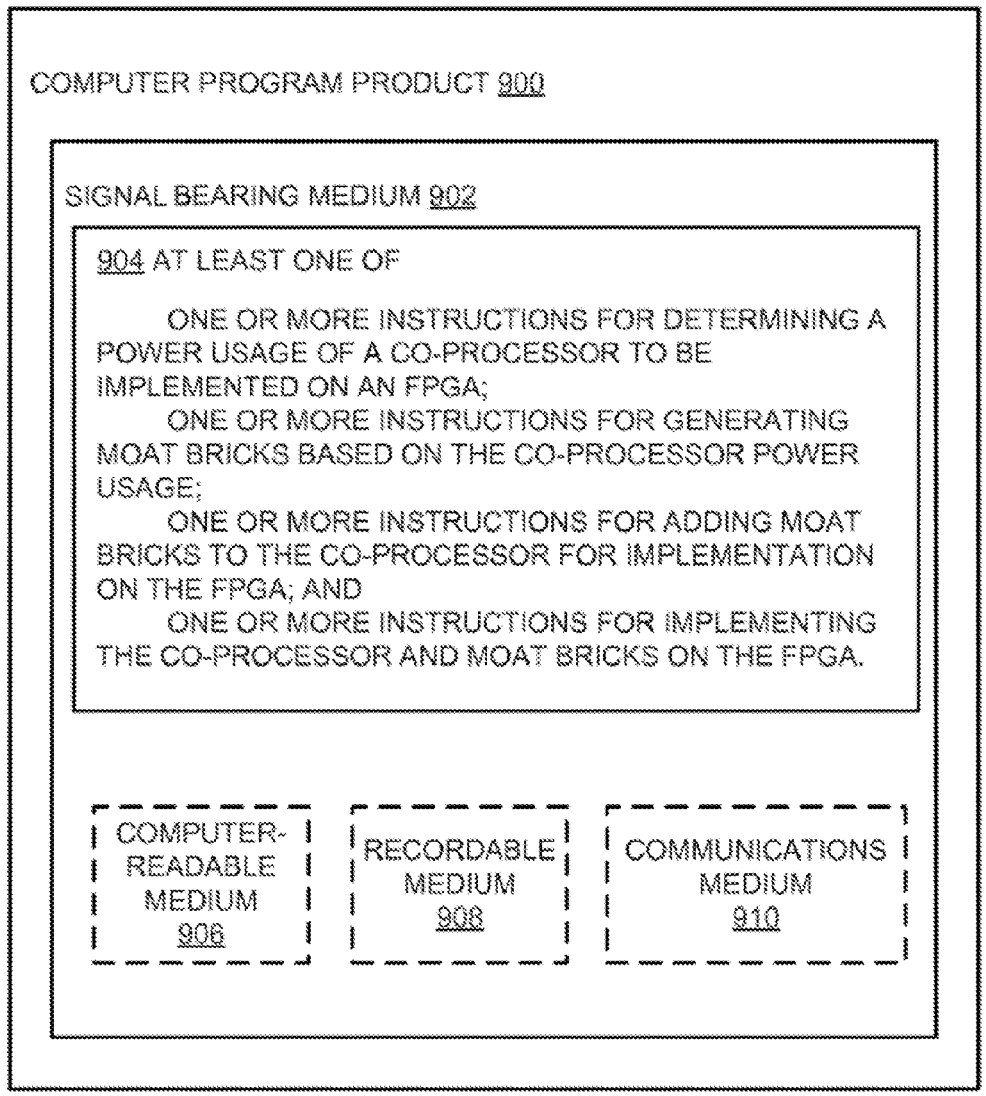
FIG. 9 illustrates a block diagram of an example computer program product, all arranged in accordance with at least some embodiments described herein.

FIG. 9 illustrates a block diagram of an example computer program product, arranged in accordance with at least some embodiments described herein.

In some examples, as shown in FIG. 9, the computer program product 900 may include a signal bearing medium 902 that may also include one or more machine readable instructions 904 that, when executed by, for example, a processor, may provide the functionality described herein. Thus, for example, referring to the processor 704 in FIG. 7, the configuration controller module 722 may undertake one or more of the tasks shown in FIG. 9 in response to the instructions 904 conveyed to the processor 704 by the signal bearing medium 902 to perform actions associated with masking power usage of co-processors implemented on FPGAs as described herein. Some of those instructions may include, for example, determining a power usage of a co-processor to be implemented on an FPGA, generating moat bricks based on the co-processor power usage, adding moat bricks to the co-processor for implementation on the FPGA, and/or implementing the co-processor and moat bricks on the FPGA, according to some embodiments described herein.

In some implementations, the signal bearing medium 902 depicted in FIG. 9 may encompass a computer-readable medium 906, such as, but not limited to, a hard disk drive, a solid state drive, a Compact Disc (CD), a Digital Versatile Disk (DVD), a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the computer program product 900 may be conveyed to one or more modules of the processor 904 by an RF bearing medium, where the signal bearing medium 902 is conveyed by the wireless communications medium 910 (e.g., a wireless communications medium conforming with the IEEE 802.11 standard).

According to some examples, a method is provided for masking co-processor power usage on a field-programmable gate array (FPGA). The method may include determining a power usage of a co-processor to be loaded on the FPGA, generating at least one moat brick circuit based on the determined power usage, loading the co-processor on the FPGA, and loading the at least one moat brick circuit on the FPGA such that the at least one moat brick circuit is physically adjacent to the co-processor and at least partially masks the power usage of the co-processor.

According to some embodiments, the co-processor is a hardware accelerator for a virtual machine. The method may further include generating multiple moat brick circuits and loading the multiple moat brick circuits on the FPGA so as to surround the co-processor loaded on the FPGA and/or refraining from loading one or more of the multiple moat brick circuits that fall outside an FPGA boundary if loaded.

According to other embodiments, the method may further include generating the at least one moat brick circuit by selecting the at least one moat brick circuit from a library of brick primitives. The method may further include adjusting a voltage variation on an FPGA power distribution trace through the at least one moat brick circuit to mask the power usage and/or employing one of negative feedback and noise addition to adjust the voltage variation at the at least one moat brick circuit. The at least one moat brick circuit may include a random number generator, a ring oscillator, a proportional-integral-differential (PID) controller, and/or at least one shift register.

According to further embodiments, the method may further include determining the power usage based on a number of gates associated with the co-processor, a number of logic units associated with the co-processor, and/or a power measured from a previous deployment. Loading the co-processor and the at least one moat brick circuit on the FPGA may include forming a composite co-processor including the co-processor and the at least one moat brick circuit and loading the composite co-processor on the FPGA according to a placer algorithm. The co-processor and/or the at least one moat brick circuit may be loaded on the FPGA via a hardware description language (HDL) file and/or netlist According to other examples, a configuration controller for masking co-processor power usage on a field-programmable gate array (FPGA) may include a moat builder module and a processing module. The moat builder module may be configured to determine a power usage of a co-processor to be loaded on the FPGA and generate at least one moat brick circuit based on the determined power usage. The processing module may be configured to load the co-processor and the at least one moat brick circuit on the FPGA such that the at least one moat brick circuit is physically adjacent to the co-processor and at least partially masks the power usage of the co-processor.

According to some embodiments, the co-processor is a hardware accelerator for a virtual machine. The moat builder module may be further configured to generate multiple moat brick circuits, and the processing module may be further configured to load the multiple moat brick circuits on the FPGA so as to surround the co-processor loaded on the FPGA and/or refrain from loading one or more of the multiple moat brick circuits that fall outside an FPGA boundary if loaded.

According to other embodiments, the moat builder module may be further configured to generate the at least one moat brick circuit by selecting the at least one moat brick circuit from a library of brick primitives. The at least one moat brick circuit may be configured to adjust a voltage variation on an FPGA power distribution trace to mask the power usage and/or employ one of negative feedback and noise addition to adjust the voltage variation. The at least one moat brick circuit may include a random number generator, a ring oscillator, a proportional-integral-differential (PID) controller, and/or at least one shift register.

According to further embodiments, the moat builder module may be further configured to determine the power usage based on a number of gates associated with the co-processor, a number of logic units associated with the co-processor, and/or a power measured from a previous deployment. The processing module may be further configured to load the co-processor and the at least one moat brick circuit on the FPGA by forming a composite co-processor including the co-processor and the at least one moat brick circuit and loading the composite co-processor on the FPGA according to a placer algorithm. The processing module may be further configured to load the co-processor and/or the at least one moat brick circuit on the FPGA via a hardware description language (HDL) file and/or a netlist file.

According to further examples, a cloud-based datacenter configured to mask co-processor power usage may include a field-programmable gate array (FPGA) and a configuration controller. The configuration controller may be configured to determine a power usage of a co-processor to be loaded on the FPGA, generate at least one moat brick circuit based on the determined power usage, and load the co-processor and the at least one moat brick circuit on the FPGA such that the at least one moat brick circuit is physically adjacent to the co-processor and at least partially masks the power usage of the co-processor.

According to some embodiments, the co-processor is a hardware accelerator for a virtual machine. The configuration controller may be further configured to generate multiple moat brick circuits, load the multiple moat brick circuits on the FPGA so as to surround the co-processor loaded on the FPGA, and/or refrain from loading one or more of the multiple moat brick circuits that fait outside an FPGA boundary if loaded.

According to other embodiments, the configuration controller may be further configured to generate the at least one moat brick circuit by selecting the at least one moat brick circuit from a library of brick primitives. The at least one moat brick circuit may be configured to adjust a voltage variation on an FPGA power distribution trace to mask the power usage and/or use negative feedback and/or noise addition to adjust the voltage variation. The at least one moat brick circuit may include a random number generator, a ring oscillator, a proportional-integral-differential (PID) controller, and/or at least one shift register.

According to further embodiments, the configuration controller may be further configured to determine the power usage based on a number of gates associated with the co-processor, a number of logic units associated with the co-processor, and/or a power measured from a previous deployment. The configuration controller may be further configured to load the co-processor and the at least one moat brick circuit on the FPGA by forming a composite co-processor including the co-processor and the at least one moat brick circuit and loading the composite co-processor on the FPGA according to a placer algorithm. The configuration controller may be further configured to load the co-processor and/or the at least one moat brick circuit on the FPGA via a hardware description language (HDL) file and/or a netlist file.

According to yet further examples, a computer-readable storage medium may store instructions for masking co-processor power usage on a field-programmable gate array (FPGA). The instructions may include determining a power usage of a co-processor to be loaded on the FPGA, generating at least one moat brick circuit based on the determined power usage, loading the co-processor on the FPGA, and loading the at least one moat brick circuit on the FPGA such that the at least one moat brick circuit is physically adjacent to the co-processor and at least partially masks the power usage of the co-processor.

According to some embodiments, the co-processor is a hardware accelerator for a virtual machine. The instructions may further include generating multiple moat brick circuits and loading the multiple moat brick circuits on the FPGA so as to surround the co-processor loaded on the FPGA and/or refraining from loading one or more of the multiple moat brick circuits that fall outside an FPGA boundary if loaded.

According to other embodiments, the instructions may further include generating the at least one moat brick circuit by selecting the at least one moat brick circuit from a library of brick primitives. The instructions may further include adjusting a voltage variation on an FPGA power distribution trace through the at least one moat brick circuit to mask the power usage and/or employing one of negative feedback and noise addition to adjust the voltage variation at the at least one moat brick circuit. The at least one moat brick circuit may include a random number generator, a ring oscillator, a proportional-integral-differential (PID) controller, and/or at least one shill register.

According to further embodiments, the instructions may further include determining the power usage based on a number of gates associated with the co-processor, a number of logic units associated with the co-processor, and/or a power measured from a previous deployment. Loading the co-processor and the at least one moat brick circuit on the FPGA may include forming a composite co-processor including the co-processor and the at least one moat brick circuit and loading the composite co-processor on the FPGA according to a placer algorithm. The co-processor and/or the at least one moat brick circuit may be loaded on the FPGA via a hardware description language (HDL) file and/or a netlist file.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.: and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to he understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms, For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for masking co-processor power usage on a field-programmable gate array (FPGA), the method comprising:
   determining a power usage of a co-processor to be loaded on the FPGA, wherein the co-processor is a hardware accelerator for a virtual machine;
   generating at least one moat brick circuit based on the determined power usage;
   loading the co-processor on the FPGA;
   loading the at least one moat brick circuit on the FPGA such that the at least one moat brick circuit is physically adjacent to the co-processor and at least partially masks the power usage of the co-processor;

forming a composite co-processor including the co-processor and the at least one moat brick circuit; and employing negative feedback to adjust a voltage variation on an FPGA power distribution trace through the at least one moat brick circuit to mask the power usage.

2. The method of claim 1, further comprising:
generating a plurality of moat brick circuits; and
loading the plurality of moat brick circuits on the FPGA so as to surround the co-processor loaded on the FPGA.

3. The method of claim 1, further comprising:
generating the at least one moat brick circuit by selecting the at least one moat brick circuit from a library of brick primitives.

4. The method of claim 1, further comprising:
employing noise addition to adjust the voltage variation at the at least one moat brick circuit.

5. The method of claim 1, wherein the at least one moat brick circuit includes at least one of a random number generator, a ring oscillator, a proportional-integral-differential (PID) controller, and at least one shift register.

6. The method of claim 1, further comprising:
determining the power usage based on at least one of a number of gates associated with the co-processor, a number of logic units associated with the co-processor, and a power measured from a previous deployment.

7. The method of claim 1, wherein loading the co-processor and the at least one moat brick circuit on the FPGA comprises:
loading the composite co-processor on the FPGA according to a placer algorithm.

8. The method of claim 1, wherein at least one of the co-processor and the at least one moat brick circuit is loaded on the FPGA via at least one of a hardware description language (HDL) file and a netlist file.

9. A configuration controller to mask co-processor power usage on a field-programmable gate array (FPGA), the controller comprising:
a moat builder module to build the co-processor moats, the moat builder module configured to:
determine a power usage of the co-processor to be loaded on the FPGA, wherein the co-processor is a hardware accelerator for a virtual machine; and
generate at least one moat brick circuit based on the determined power usage; and
a processor configured to:
load the co-processor on the FPGA;
load the at least one moat brick circuit on the FPGA such that the at least one moat brick circuit is physically adjacent to the co-processor and at least partially masks the power usage of the co-processor;
form a composite co-processor including the co-processor and the at least one moat brick circuit, wherein the at least one moat brick circuit is configured to employ negative feedback to adjust a voltage variation on an FPGA power distribution trace to mask the power usage; and
load the composite co-processor on the FPGA according to a placer algorithm.

10. The controller of claim 9, wherein:
the moat builder module is further configured to generate a plurality of moat brick circuits; and
the processor is further configured to load the plurality of moat brick circuits on the FPGA so as to surround the co-processor loaded on the FPGA.

11. The controller of claim 10, wherein the processor is further configured to refrain from loading one or more of the plurality of moat brick circuits that fall outside an FPGA boundary if loaded.

12. The controller of claim 9, wherein the at least one moat brick circuit is further configured to employ noise addition to adjust the voltage variation.

13. The controller of claim 9, wherein the at least one moat brick circuit includes at least one of a random number generator, a ring oscillator, a proportional-integral-differential (PID) controller, and at least one shift register.

14. The controller of claim 9, wherein the moat builder module is configured to determine the power usage based on at least one of a number of gates associated with the co-processor, a number of logic units associated with the co-processor, and a power measured from a previous deployment.

15. The controller of claim 9, wherein the processor is further configured to load at least one of the co-processor and the at least one moat brick circuit on the FPGA via at least one of a hardware description language (HDL) file and a netlist file.

16. A cloud-based datacenter configured to mask co-processor power usage, the datacenter comprising:
a field-programmable gate array (FPGA); and
a processor implemented in one of a plurality of servers of the datacenter configured to:
determine a power usage of a co-processor to he loaded on the FPGA, wherein the co-processor is a hardware accelerator for a virtual machine;
generate at least one moat brick circuit based on the determined power usage;
load the co-processor on the FPGA;
load the at least one moat brick circuit on the FPGA such that the at least one moat brick circuit is physically adjacent to the co-processor and at least partially masks the power usage of the co-processor;
form a composite co-processor including the co-processor and the at least one moat brick circuit, wherein the at least one moat brick circuit is configured to use negative feedback to adjust a voltage variation on an FPGA power distribution trace to mask the power usage; and
load the composite co-processor on the FPGA according to a placer algorithm.

17. The datacenter of claim 16, wherein the processor is further configured to generate the at least one moat brick circuit by selecting the at least one moat brick circuit from a library of brick primitives.

18. The datacenter of claim 16, wherein the at least one moat brick circuit is further configured to use noise addition to adjust the voltage variation.

19. The datacenter of claim 18, wherein the at least one moat brick circuit includes at least one of a random number generator, a ring oscillator, a proportional-integral-differential (PID) controller, at least one shift register.

20. The datacenter of claim 16, wherein the processor is configured to determine the power usage based on at least one of a number of gates associated with the co-processor, a number of logic units associated with the co-processor, and a power measured from a previous deployment.

21. The datacenter of claim 16, wherein the processor is further configured to load at least one of the co-processor and the at least one moat brick circuit on the FPGA via at least one of a hardware description language (HDL) file and a netlist file.

* * * * *